United States Patent
Amjadi

(10) Patent No.: US 10,198,763 B2
(45) Date of Patent: Feb. 5, 2019

(54) COMPUTER PROGRAM, METHOD, AND SYSTEM FOR MATCHING CONSUMERS WITH SERVICE PROVIDERS

(71) Applicant: ReviewMyContract LLC, Leawood, KS (US)

(72) Inventor: Omid Amjadi, Leawood, KS (US)

(73) Assignee: ReviewMyContract LLC, Leawood, KS (US)

(*) Notice: Subject to any disclaimer, the term of this patent is extended or adjusted under 35 U.S.C. 154(b) by 622 days.

(21) Appl. No.: 14/667,382

(22) Filed: Mar. 24, 2015

(65) Prior Publication Data
US 2015/0278903 A1    Oct. 1, 2015

Related U.S. Application Data
(60) Provisional application No. 61/970,208, filed on Mar. 25, 2014.

(51) Int. Cl.
*G06Q 30/00* (2012.01)
*G06Q 30/06* (2012.01)
*G06Q 50/18* (2012.01)

(52) U.S. Cl.
CPC ......... *G06Q 30/0625* (2013.01); *G06Q 50/18* (2013.01)

(58) Field of Classification Search
CPC .............................. G06Q 30/06; G06Q 30/08
USPC ................................................ 705/26.1, 27.1
See application file for complete search history.

(56) References Cited

U.S. PATENT DOCUMENTS

| | | | |
|---|---|---|---|
| 2001/0009008 A1* | 7/2001 | Ovadya ................. | G06F 9/5055 |
| 2002/0069067 A1* | 6/2002 | Klinefelter ............. | G06Q 10/10 |
| | | | 704/270.1 |
| 2002/0120554 A1* | 8/2002 | Vega ....................... | G06Q 20/10 |
| | | | 705/37 |
| 2004/0049450 A1 | 3/2004 | Lussler | |
| 2006/0020561 A1* | 1/2006 | Kodimer ............ | G06Q 30/0283 |
| | | | 705/400 |

(Continued)

OTHER PUBLICATIONS

First-of-Its-Kind Lawyer Network Launched Through USLaw.com Web Site. PR Newswire. New York [New York]. Jun. 1, 2000: 1. Downloaded from ProQuestDirect on the Internet on Sep. 3, 2017, 4 pages.*

(Continued)

*Primary Examiner* — Mila Airapetian
(74) *Attorney, Agent, or Firm* — Hovey Williams LLP

(57) ABSTRACT

A method for matching consumers with service providers, including the initial step of receiving service provider profile data from one or more service providers. Additional steps include: receiving service request data from a consumer; comparing, based on a matching criteria, the service request data with the service provider profile data to obtain a primary set of service providers; presenting, to the consumer, at least a portion of the service provider profile data of each of the service providers included in the primary set; receiving a selection by the consumer to transact with a first service provide; presenting information a request to the first service provider to either accept or reject to transact with the consumer; and obtaining a secondary set of service providers from the one or more service providers and presenting the secondary set of service providers to the consumer.

13 Claims, 11 Drawing Sheets

(56) References Cited

U.S. PATENT DOCUMENTS

| | | | |
|---|---|---|---|
| 2008/0300973 A1* | 12/2008 | DeWitt | G06Q 10/08 705/14.21 |
| 2010/0106738 A1 | 4/2010 | Anderson | |
| 2010/0293487 A1* | 11/2010 | Schoenberg | G06Q 10/101 715/764 |
| 2011/0029405 A1* | 2/2011 | Cronin | G06O 30/0613 705/26.41 |
| 2011/0282793 A1 | 11/2011 | Mercuri et al. | |
| 2012/0311462 A1* | 12/2012 | Devecka | H04W 4/206 715/753 |
| 2013/0005368 A1* | 1/2013 | Hunziker | H04W 12/10 455/466 |
| 2014/0129366 A1* | 5/2014 | Mudhar | G06Q 30/0611 705/26.4 |
| 2014/0136443 A1* | 5/2014 | Kinsey, II | G06Q 10/063116 705/347 |
| 2014/0180715 A1* | 6/2014 | Phillips | G06Q 30/0601 705/2 |
| 2014/0289070 A1* | 9/2014 | Copley | G06Q 50/16 705/26.7 |
| 2015/0235313 A1* | 8/2015 | Jiang | G06Q 40/04 705/37 |

OTHER PUBLICATIONS

International Search Report and Written Opinion issued in Corresponding PCT/US15/22295, dated Sep. 1, 2015 (10 pages).

* cited by examiner

UPLOAD YOUR CONTRACT

Before you get started you need to upload a contract first. Once you have uploaded your contract and filled a brief intake form you will be able to find a law firm from the network of member law firms in your area of choice. If you have any questions, please use our FAQ section.

| DOCUMENT SIZE | STANDARD ⓘ | RUSH ⓘ |
|---|---|---|
| 1 to 3 pages | $250 | $350 |
| 4 to 6 pages | $350 | $450 |
| 7 to 9 pages | $450 | $550 |
| 10 to 12 pages | $550 | $650 |
| 13 to 15 pages | $650 | $750 |
| 16 to 19 pages | $750 | $850 |
| 20+ pages | As Quoted by Law Firm | |

| CONSULTATION TIME | STANDARD ⓘ | RUSH ⓘ |
|---|---|---|
| Up to 30 minutes | Included | Included |
| Hourly Rate | $175 | $250 |

⊛ Please fill out every field

Browse... No file selected. ⊛

Name this contract
[_____] ⊛

Are all pages included with this contract?
Yes ○    No ○

Length of Contract ⓘ        Review Type ⓘ
[1 to 3 pages ▼]              [Standard ▼]

Please review your responses on this page to ensure accuracy before continuing to the next step.

[Next: Intake Form]    [Cancel]

Name Street

City State

Zip Phone

CONTRACT DETAILS

The subject matter of the contract? — Services Agreement | You are? — An individual The other party is? — An individual | Education level — High school Approximate total value of contract? — $ | What is the Term (duration) of the contract?

What is your occupation?

Briefly offer any additional information you would like the attorney to know about this contract Please review your responses on this page to ensure accuracy before continuing to the next step.

Next: Select Law Firm

Please complete the information below and send.

Name*

| First | Last |

Law Firm Name*

Phone Number*

Email*

Address*

City

State / Province / Region

Zip

Country

United States 

Years In Existence*

Jurisdictions Licensed To Practice * Check all that apply

Practice Area(s) * Check all that apply

| | |
|---|---|
| ☐ Administrative Law | ☐ Agricultural Law |
| ☐ Antitrust & Trade Regulation | ☐ Bankruptcy, Banking & Credit |
| ☐ Business- Litigation | ☐ Business- Traditional |
| ☐ Civil Rights & Discrimination | ☐ Class Action- Mass Tort Litigation |
| ☐ Constitutional Law | ☐ Construction Law |
| ☐ Consumer Law | ☐ Contracts |
| ☐ Criminal Law | ☐ Cyberspace Law |
| ☐ Education Law | ☐ Employment & Labor Law |
| ☐ Entertainment, Media, & Sports Law | ☐ Environmental Law |
| ☐ Family Law | ☐ Government Contracts |
| ☐ Health & Elder Care | ☐ Immigration Law |
| ☐ Insurance Law | ☐ Intellectual Property |
| ☐ Medical Malpractice | ☐ Personal Injuray |
| ☐ Product Liability | ☐ Real Estate aw |
| ☐ Securities | ☐ Tax Law |
| ☐ Transportation/Admirality/Maritime | ☐ Will, Trusts & Estates |
| ☐ Workers' Compensation | ☐ Other |

Submit

FIG. 4 (CONT.)

REJECT CONTRACT

YOU MAY SELECT ONE OF THE PRE-FORMATTED REJECTION MESSAGES BELOW OR DRAFT YOUR OWN.

○ Due to a conflict that we have with the party/parties represented in this contract, we must decline representation. We strongly encourage you to seek representation by other counsel as soon as possible to protect your rights and interests. Please be advised that any information provided by you to this law firm will remain confidential.

○ Based on the time frame that you ave requested, we are unable to comply with the timeframes you have requested and decline representation. We strongly encourage you to seek representation by other counsel as soon as possible to protect your rights and interests. Please be advised that any information provided by you to this law firm will remain confidential.

○ After an initial review of your contract we regret to inform you that the subject matter is beyond the scope of this law firm's areas of practice expertise. We strongly encourage you to seek representation by other counsel as soon as possible to protect your rights and interests. Please be advised that any information provided by you to this law firm will remain confidential.

○ I will draft my own.

Reason for rejecting representation

[ Reject ]

FIG. 7

SUBMIT CONTRACT

[Find Law Firm]

HELPFUL TIPS

Upload all pages of your contract as each page can have legal significance

You cannot submit a contract for review unless all intake form questions are answered Make sure your contract is in an acceptable digital format (text, doc, docx or PDF) prior to uploading

800

| | NAME | STATUS | LAW FIRM | UPDATED |
|---|---|---|---|---|
| View | Non Disclosure Agreement | Pending Engagement Letter | Your Law Firm LLP | 01-18-14 at 07:06PM |
| View | June 6 2013 contract | Contract Under Review | Demo Law Firm | 06-06-13 at 02:58PM |
| View | June 11 Doc | Pending Engagement Letter | Your Law Firm LLP | 06-11-13 at 07:18AM |
| View | CONTRACT | Representation Rejected By Selected Law Firm | Your Law Firm LLP | 06-21-13 at 10:48AM |
| View | new june 19 | Pending Engagement Letter | Your Law Firm LLP | 06-21-13 at 10:48AM |
| View | MPA | Pending Representation Notification | Demo Law Firm | 06-19-13 at 01:53PM |
| View | June 23 contract | Representation Rejected By Selected Law Firm | Your Law Firm LLP | 06-23-13 at 07:23PM |
| View | June 23 Contract REV | Pending Engagement Letter | Your Law Firm LLP | 06-23-13 at 07:26PM |
| View | July 8 2013 contract | Representation Rejected By Selected Law Firm | Your Law Firm LLP | 03-14-14 at 08:10AM |
| View | Contract | Intake Form Complete | | 02-24-14 at 07:23PM |
| View | Contract II | Pending Representation Notification | Demo Law Firm | 02-28-14 at 12:58PM |
| View | March 2 document | Pending Engagement Letter | Your Law Firm LLP | 03-02-14 at 04:00PM |
| View | Contract 3 | Pending Representation Notification | Demo Law Firm | 03-03-14 at 11:42AM |
| View | March 5 MSA | Pending Engagement Letter | Your Law Firm LLP | 03-05-14 at 09:50AM |

FIG. 8

| View Private Firm Documents | | | | |
|---|---|---|---|---|
| NAME | STATUS | CLIENT | UPD | 01-1 |
| Non Disclosure Agreement | Pending Engagement | John Doe | | |
| June 11 Doc | Pending Engagement | John Doe | 06-11-13 at 07:18AM | |
| new june 19 | Pending Engagement | John Doe | 06-21-13 at 10:48AM | |
| June 23 Contract REV | Pending Engagement | John Doe | 06-23-13 at 07:26PM | |
| July 9 Contract | Pending Engagement | John Doe | 07-09-13 at 05:20PM | |
| July 10 NDA | Pending Engagement | John Doe | 07-10-13 at 03:26PM | |
| Contract | Pending Engagement | John Doe | 01-18-14 at 07:04PM | |
| contract | Pending Engagement | John Doe | 01-18-14 at 07:03PM | |
| rick nda | Pending Engagement | John Doe | 01-19-14 at 08:40AM | |
| Ace Contract | Pending Engagement | John Doe | 01-19-14 at 08:42AM | |
| Agreement | Pending Engagement | John Doe | 01-18-14 at 06:13PM | |
| Contract | Pending Engagement | John Doe | 02-24-14 at 10:55AM | |
| Agreement | Pending Engagement | Bob Doe | 02-24-14 at 01:48PM | |
| Feb 26 2014 | Pending Engagement | John Doe | 02-26-14 at 07:05PM | |
| Contract | Pending Engagement | John Doe | 02-28-14 at 08:43AM | |
| March 2 document | Pending Engagement | John Doe | 03-02-14 at 04:00PM | |
| March 5 MSA | Pending Engagement | John Doe | 03-05-14 at 09:50AM | |
| Test.doc | Pending Engagement | Tod Doe | 03-13-14 at 11:02AM | |

Pending Engagement
- Require Action
- Firm Selected
- Pending Engagement
- Paid
- Complete
- Rejected.

900

FIG. 9

COMPUTER PROGRAM, METHOD, AND SYSTEM FOR MATCHING CONSUMERS WITH SERVICE PROVIDERS

CROSS-REFERENCE TO RELATED APPLICATIONS

The present application claims the priority benefit of U.S. Provisional Patent Application Ser. No. 61/970,208, filed Mar. 25, 2014, and entitled COMPUTER PROGRAM, METHOD, AND SYSTEM FOR MATCHING CONSUMERS WITH SERVICE PROVIDERS, incorporated by reference in its entirety herein.

FIELD

Embodiments of the present invention provide a computer program, method, and system for matching consumers with service providers. In more detail, embodiments of the present invention are directed to a computer program, method, and system for matching consumers in need of services with service providers capable of rendering such services. Furthermore, embodiments of the present invention facilitate the engagement of service providers with consumers and also the payment by the consumers for services rendered by the service providers.

BACKGROUND

Currently, to obtain certain types of services, such as legal services, a consumer is required to perform independent research to determine which service providers (e.g., attorneys, law firms, etc.) are available to perform such services. Such research can be time-consuming, as the consumer is generally required to sift through numerous service providers listed online, listed in the yellow-pages, or referred to by third-parties. Consumers must try to determine, through trial and error, which service providers are best suited for performing their required service. Once the consumer has narrowed down a list of service providers capable of performing their services, the consumer must then hassle with payment negotiation processes. In the case of legal service, the service providers are generally remunerated based on hourly fees. As such, it is often difficult to know, up-front, the final price the consumer will be charged for completing the required service. Regardless, the consumer can generally assume that the final price owed to the service provider will be significant and uncertain.

Therefore, there is a need for a computer program, system, and method that facilitates the matching of consumers with service providers. Furthermore, there is a need for a computer program, system, and method that facilitates the engagement of service providers with consumers and also facilitates quick and efficient payment for such services by the consumers.

SUMMARY

Embodiments of the present invention include a method for matching consumers with service providers. The method includes the initial step of receiving service provider profile data from one or more service providers. An additional step includes receiving service request data from a consumer. An additional step includes comparing, based on a matching criteria, the service request data with the service provider profile data to obtain a primary set of service providers from the one or more service providers, with the primary set including at least one of the one or more service providers. An additional step includes presenting, to the consumer, at least a portion of the service provider profile data of each of the service providers included in the primary set. An additional step includes receiving information indicative of a selection by the consumer to transact with a first service provider, with the first service provider being selected from the primary set of service providers presented to the user. An additional step includes presenting information indicative of a request to the first service provider to either accept or reject to transact with the consumer. Upon receiving, from the first service provider, information indicative of a rejection to transact with the consumer, a further step includes obtaining a secondary set of service providers from the one or more service providers and presenting the secondary set of service providers to the consumer.

Embodiments of the present invention additionally include a method for facilitating a consumer's payment to a service provider. The method comprises the initial step of providing service provider profile data corresponding to one or more service providers. An additional step includes receiving service item data from a consumer. A next step includes receiving information indicative of a selection by the consumer to transact with a first service provider, with the first service provider being included in the one or more service providers. A next step includes determining a service price for the consumer to transact with the first service provider, wherein the service price is based in part on the service item data. A further step includes receiving payment information, corresponding to the service price, from the consumer and providing the payment information to the service provider or to a financial institution associated with the service provider.

Embodiments of the present invention further include a method for matching consumers with service providers. The method includes the initial step of providing access to service provider profile data from one or more service providers. An additional step includes receiving service request data from the consumer. An additional step includes receiving service item data from the consumer. An additional step includes matching a primary set of service providers included within the one or more service providers with the consumer based on a comparison between the service request data and the service provider profile data. An additional step includes presenting, to the consumer, at least a portion of the service provider profile data of each of the service providers included in the primary set. An additional step includes receiving information indicative of a selection by the consumer to transact with a first service provider, with the first service provider being included in the primary set of service providers presented to the user. An additional step includes receiving engagement data from the service provider and presenting the engagement data to the consumer. An additional step includes receiving information indicative of an acceptance of the information included within the engagement data from the consumer. A further step includes receiving payment information from the consumer and providing the payment information to the service provider or to a financial institution associated with the service provider.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 2 is a depiction of a service request upload screen according to embodiments of the present invention;

FIG. 3 is a depiction of a client information screen according to embodiments of the present invention;

FIG. 4 is a depiction of service provider profile data screen according to embodiments of the present invention;

FIG. 7 is a depiction of a declination screen according to embodiments of the present invention;

FIG. 8 is a depiction of a service item summary screen according to embodiments of the present invention;

FIG. 9 is a depiction of a service provider summary screen according to embodiments of the present invention.

Figure 1:
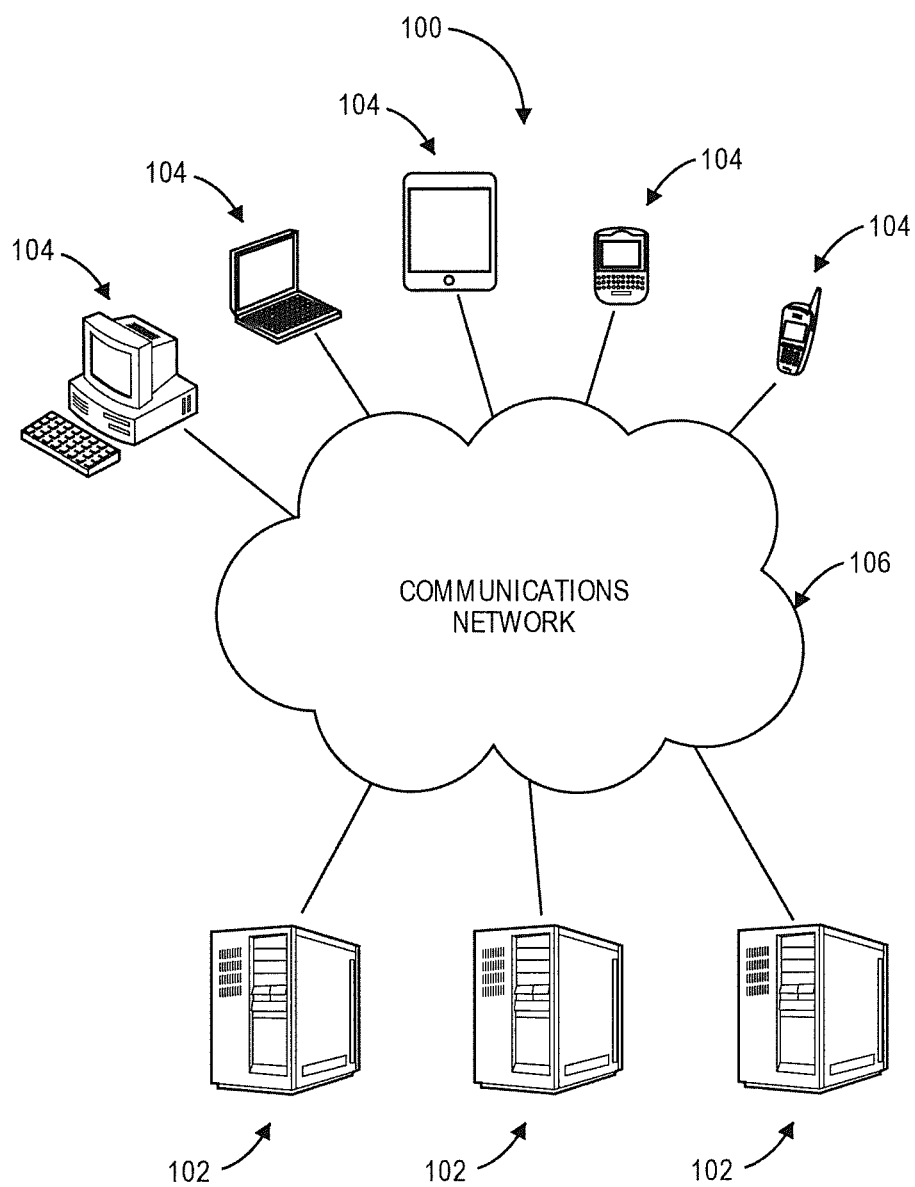
FIG. 1 is a schematic depiction of a system for matching consumers with service providers in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The present invention provides various embodiments of a computer program, a method, a process and a system for matching consumers with service providers. As used herein, the term "matching" is defined to mean coordinating consumers with or directing or guiding consumers to one or more service providers that are capable of performing services for the consumers, according to consumer criteria. In other words, the term refers to coordinating consumers with a focused set of service provider options that match consumer criteria, as opposed to pairing up a given consumer with a specific service provider. It is understood, as will be described in more detail below, that certain embodiments of the present invention provide for consumers to choose the specific service providers that will perform the services for the consumers. The computer program of embodiments of the present invention may comprise a plurality of code segments executable by a computing device for performing the steps of the method of the present invention. With reference to FIG. 1, the computer program, process, system, and method of embodiments of the present invention may be implemented in hardware, software, firmware, or combinations thereof using a system 100, which broadly comprises server devices 102, computing devices 104, and a communications network 106. The server devices 102 may include any types of computing devices that provide access to one or more general computing resources, such as Internet services, data transfer services, data processing services, data storage services, electronic mail services, and the like. The server devices 102 may also provide access to a database that stores information and data necessary for the implementation of the computer program of embodiments of the present invention.

The server devices 102 and the computing devices 104 include any device, component, or equipment with a processing element and associated memory elements. The processing elements may implement operating systems, and may be capable of executing the computer program, which is also generally known as instructions, commands, software code, executables, applications ("apps"), and the like. The processing elements may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, the server devices 102 may further include file stores comprising a plurality of hard disk drives, network attached storage, or a separate storage network.

The computing devices 104 may specifically include work stations, desktop computers, laptop computers, mobile communication devices (including wireless devices), palmtop computers, tablet computers, portable digital assistants (PDA), smartphones, and the like, or combinations thereof. Various embodiments of the computing device 104 may also include voice communication devices, such as cell phones and/or smart phones. In preferred embodiments, the computing device 104 will have an electronic display operable to display visual graphics, images, text, etc., such as a liquid crystal display, a plasma display, or a touch screen. In certain embodiments, the computer program of the present invention facilitates interaction and communication through a graphical user interface (GUI) that is displayed via the electronic display. The GUI enables the user to interact with the electronic display by touching or pointing at display areas to provide information to the computing device 104. In additional preferred embodiments, the computing device 104 may include an optical device such as a digital camera, video camera, scanner, or the like, such that the computing device 104 can capture, store, and transmit digital images and/or videos.

The computing devices 104 may include a user control interface that enables one or more users to share information and commands with the computing devices 104, or with the server devices 102 via the communications network 106. The user control interface may comprise one or more functionable inputs such as buttons, keyboard, switches, scrolls wheels, voice recognition elements such as a microphone, pointing devices such as mice, touchpads, tracking balls, and/or styluses. The user control interface may also include a speaker for providing audible instructions and feedback. Further, the user control interface may comprise wired or wireless data transfer elements, such as a communication component, removable memory, data transceivers, and/or transmitters, to enable the user and/or other computing devices to remotely interface with the computing device 104.

The communications network 106 may be wired or wireless and may include servers, routers, switches, wireless receivers and transmitters, and the like, as well as electrically conductive cables or optical cables. The communications network 106 may also include local, metro, or wide area networks, as well as the Internet, or other cloud networks. Furthermore, the communications network 106 may include cellular or mobile phone networks, as well as landline phone networks, public switched telephone networks, fiber optic networks, or the like.

Both the server devices 102 and the computing devices 104 may be connected to the communications network 106. Server devices 102 may be able to communicate with other server devices 102 or computing devices 104 through the communications network 106. Likewise, computing devices 104 may be able to communicate with other computing devices 104 or server devices 102 through the communications network 106. As previously described, the connection to the communications network 106 may be wired or wireless. Thus, the server devices 102 and the computing devices 104 may include the appropriate components to establish a wired or a wireless connection.

The computer program of the present invention may run on computing devices 104 or, alternatively, may run on one or more server devices 102. In some embodiments, a first portion of the program, code, or instructions may execute on a first server device 102 or a first computing device 104, while a second portion of the program, code, or instructions may execute on a second server device 102 or a second computing device 104. In some embodiments, other portions of the program, code, or instructions may execute on other server devices 102 or computing devices 104 as well. For example, information related to the system 100 may be stored on a memory element associated with the server device 102, such that the information is remotely accessible to users of the computer program via one or more computing devices 104. Alternatively, some information may be directly stored on the memory element associated with the one or more computing devices 104 of the user. In additional embodiments of the present invention, a portion of the information may be stored on the server device 102, while another portion may be stored on the one or more computing devices 104. The various actions and calculations described herein as being performed by or using the computer program may actually be performed by one or more computers, processors, or other computational devices, such as the computing devices 104 and/or server devices 102, independently or cooperatively executing portions of the computer program.

In certain embodiments of the present invention, the computer program may be embodied in a stand-alone computer program downloaded on a user's computing device 104 or in a web-accessible computer program that is accessible by the user's computing device 104 via the network 106. For the stand-alone program, a downloadable version of the computer program may be stored, at least in part, on the server device 102. A user can download at least a portion of the computer program onto the computing device 104 via the network 106. In such embodiments of the present invention, the computer program may be an "application," such as an "app" for a mobile device from which the users can interact with various embodiments of the present invention. After the computer program has been downloaded, the program can be installed on the computing device 104 in an executable format. The executable form of the program permits the user to access embodiments of the present invention via an electronic resource, such as a mobile "app" or a website. For the web-accessible computer program, the user may access the computer program via the network 106 (e.g., the Internet) with the computing device 104.

Certain embodiments of the present invention may facilitate users to be provided with different types of accounts. Each type of user account may provide their respective users with unique roles, capabilities, and permissions with respect to implementing embodiments of the present invention. For instance, a consumer may be provided with a consumer account that permits the consumer to access embodiments of the present invention such that the consumer can request to be matched with a service provider for the purposes of obtaining a service. Additionally, a service provider may be provided with a service provider account that permits the service provider to access embodiments of the present invention so as to be matched with a consumer for purposes of providing a service. In addition, embodiments of the present invention may include any number and/or any specific types of account as may be necessary to carry out the functions, features, and/or implementations of the present invention.

Upon a consumer and/or service provider (i.e., a "user") logging in to the electronic resource for a first time, the user may be required to provide various pieces of identification information to create their respective accounts. Such identification information may include, for instance, personal name, business name, physical address, phone number, email address, website URL, or the like. Upon providing the identification information, the user may be required to enter a username and password, which will be required to access the electronic resource. In certain embodiments, the user will also be required to agree to a "Terms and Condition" agreement, which outlines the conditions by which the user accesses and implements embodiments of the present invention.

Although certain embodiments of the present invention may require a user to establish an account, certain other embodiments may provide for some features of the present invention to be utilized without requiring the establishment of a user account. For instance, a user may access the online resource, e.g., a mobile app or online website, and browse the various functions and features that may be provided via embodiments of the present invention. As an example, the electronic resource may display general pricing for service providers to perform services for consumers. In some embodiments, the electronic resource will make one or more videos available for review by users. For instance, the videos may include instructional videos which users can play, via their computing devices 104, so as to obtain information on how to implement embodiments of the present invention (with such embodiments discussed in more detail below). In other embodiments, the electronic resource can include a blog section, which can be used to provide informative information. The blog section can provide information that was written by an administrative user, for instance, and which instructs users how to implement one or more functions and features of embodiments of the present invention. In some alternative embodiments, the blog section can be used by general users (e.g., consumers and/or service providers) to provide comments and/or rating on the various functions and features of embodiments of the present invention and/or on other users of embodiments of the present invention.

Although the following description is directed generally to consumers wishing to obtain legal services in the form of legal document reviews (e.g., contract reviews) from attorneys and/or law firms, it is understood that embodiments of the present invention can be directed to various types of consumers wishing to have a wide range of potential services performed by a various types of service providers. Nevertheless, as used herein, the term "consumer" generally refers to an individual or entity in need of legal services, and the term "service provider" generally refers to an attorney or law firm that may provide such legal services.

Embodiments of the present invention provide an intuitive, user-friendly system 100 for a consumer to obtain services from a service provider. Upon a consumer logging on to the electronic resource, the consumer may be presented with a service request upload screen 200, such as illustrated in FIG. 2, which allows a user to upload service request data from the consumer's computing device 104 to the server device 102. The service request data may include a service item in the form of a legal document. In some embodiments, the legal document will be a legal contract as will be describe in more detail below.

As shown in FIG. 2, embodiments of the present invention provide for a consumer to upload the service item from the user's computing device 104 to the server device 102. The service item may be any type of legal document such as a legal contract. For instance, illustrative examples of such service items may include non-disclosure agreements, employment agreements, service agreements, assignment agreements, license agreements, asset purchase agreements, or the like. The service item may be uploaded in various digital formats, such as .txt, .wps, .doc, .docx, .pdf, or the like. In some instances, embodiments of the present invention will provide for a hard-copy/paper version of the service item to be scanned, e.g., via the optical device of the computing device 104, and uploaded to the server device 102 in various data formats. In some embodiments, the service request data may also include a name for the service item, which the consumer may provide. The service item name may be used as the title of the uploaded service item.

Before, after, or at the same time as the service item is uploaded, the consumer may provide various types of additional service request data, which is related to the service item and/or the services to be performed by the service provider (i.e., the attorney/law firm). For example, such service request data may include an amount of information included in the service item. In more detail, the consumer may indicate a size of the service item, e.g., how many pages, how many words, or how many characters are included in the service item. The consumer may also provide an indication as to whether all of the pages to the service item were uploaded. Alternatively, embodiments of the present invention may be used to automatically determine the amount of information included in the service item. For example, once the service item has been uploaded, embodiments may determine the amount of information is included therein by determining a file size (e.g., kilobytes, megabytes, etc.) of the service item. Embodiments of the present invention may further, or alternatively, analyze the service item by scanning the service item, via character recognition programs, to determine how many pages, words, or characters are included within the service item.

Upon uploading the service item to the server device 102, the user may additionally be required to upload various other types of service request data. As shown in FIG. 3, such other service request data may include client information that is required to be input via client information screen 300. Such client information may include information associated with the consumer (or other entity that is to be the primary party of interest of the service item to be reviewed if not the consumer). The client information may identify whether the consumer is an individual or an entity. The client information may also indicate an occupation of the consumer, an education level of the consumer, the consumer's individual or legal name, the consumer's address (e.g., street, city, state, ZIP code), and/or the consumer's telephone number. In some embodiments, the client information may be different from the identification information that is associated with the consumer's account.

In other embodiments, the consumer may be required to provide service request data in the form of providing identification of adverse parties to the legal contract. Such adverse parties may be identified by indicating whether the adverse party is an individual or an entity and/or by including the adverse party's individual or legal name, address (e.g., street, city, state, ZIP code), and/or telephone number.

The service request data may additionally include, a subject matter of the contract (e.g., employment law, intellectual property law, corporate law, etc.), a monetary amount covered by the contract (e.g., salary, royalty rate, sales price, etc.), a duration of the contract (e.g., the contract will be in effect for 3 years). Finally, the service request data may include any other information that the consumer considers to be pertinent. Such other information may be added in a form-free input section, thereby providing the consumer with the ability to freely include any potentially applicable information.

Embodiments of the present invention are further operable to determine and/or set a price for services provided by the service provider, with such price being based, in part, by the amount of information included in the service item that is uploaded. For example, as shown in FIG. 2, the price for a service provider to review an uploaded service item may be based on page length. The length of the service item may be manually input by the consumer, such as shown in FIG. 2. In some embodiments, the price may be reasonably adjusted if formatting of the service item differs from a standard 8.5"×11" letter-sized paper, a standard 0.5" inch margin, and/or a standard 10-point font size. Alternatively, embodiments of the present invention may automatically determine the length of the service item, as was previously described, so as to automatically determine a price for the service provider to perform the service.

Additionally, the price for performing the service may also be based on the time frame in which the consumer needs the service item reviewed. For example, embodiments may provide for pricing to be based on a standard review rate and a rush review rate. If a consumer needs the service provider to review the service on a rush review basis, the price to review the service item may be higher than the price to review the same service item on a standard review basis. As shown in FIG. 2, the consumer may provide an indication of whether the consumer requires the service to be performed under the standard or rush review. Furthermore, embodiments may provide for other criteria on which to base the price for reviewing the service item. For instance, the price may be dependent on a subject matter of the service item (e.g., employment law contract, intellectual property law contract, corporate law contact, etc.). In still other embodiments, the price may be dependent on the experience level of the service provider. For example, if the consumer wishes to have their legal contract reviewed by a service provider (e.g., attorney or law firm) with a significant amount of experience (e.g., more than 10 years' experience), then such a service may have a higher price than a service performed by a service provider with less experience (e.g., less than 3 years' experience). Certain embodiments of the present invention may also provide for certain services being provide by service providers to include a predetermined amount time for the consumer to consult with the service provider (e.g., via in-person meetings, phone calls, etc.). Embodiments may also provide for the consumer to choose to purchase additional consultation time. Such additional consultation time may be charged incrementally according to the service providers' normal hourly rate.

Once the consumer has uploaded the service item and provided the related service request data, embodiments of the present invention will present a set of one or more service providers (e.g., attorneys/law firms) to the consumer, e.g., via the electronic display of the user's computing device 104, which can be selected by the consumer to perform the requested service for the consumer.

However, before a service provider can be presented to and/or selected by the consumer, one or more service providers must have previously provided service provider profile data to the server device 102 via embodiments of the present invention. In more detail, embodiments of the present invention provide for a plurality of service providers to provide service provider profile data for storage in the database associated with the server 102 of the system 100 of embodiments of the present invention. In some embodiments, the service provider profile data will be used to determine which service providers are presented to the consumers. For example, and as will be discussed in more detail below, the service request data of the consumer can be compared with such service provider profile data stored in the database so as to determine appropriate service providers to be presented to the consumer. In other embodiments, however, portions of such service provider profile data may be used only to determine which service providers will be included with and/or stored in the database. For instance, in some embodiments, service providers will be required to meet certain standards, such having a state license to practice law, before such service providers are allowed to be included with and/or stored in the database and/or are available to be presented to a consumer.

In certain embodiments, the service provider profile data may be provided and/or uploaded by the service providers via their computing devices 104 to the server devices 102 over the communications network 106. As illustrated by FIG. 4, the service provider profile data may be input by the service provider via a service provider profile data screen 400. The service provider profile data may include the service provider's name (i.e., personal and/or law firm), address (e.g., street, city, state, ZIP code), website uniform resource locator (URL), email address, and/or telephone number. In some embodiments, only the above-described service provider profile data will need to be provided (in addition to payment gateway information, which will be described in more detail below) will need to be provided by the service providers so as to be eligible for presentation to consumers. In certain embodiments, the service providers may also be required to provide payment registration information so as to be eligible for presentation to the consumers. Such payment registration information may comprise credit card information from which embodiments of the present invention can facilitate processing of a credit card payment. In further alternative embodiments, the service provider profile data that is required to be provided by the service providers may also include an experience level of the service provider (e.g., years of practice). Furthermore, the service provider profile data may include the jurisdictions in which the service provider is authorized to perform services. For example, in embodiments in which the service provider is an attorney/law firm, the profile data may include each of the states in which the service provider is licensed to practice law. As previously mentioned, however, portions of such service provider profile data may only be used to determine which service providers will be included and/or stored in the database for use in embodiments of the present invention. Nevertheless, as discussed below, such service provider profile data may also be used to determine which service providers to present to consumers.

Once service request data of a consumer and service provider profile data of service providers are provided to the server 102, embodiments of the present invention are operable to determine one or more service providers to be presented to the consumer via the consumer's computing device 104. As a result, the consumer can select, from the presented service providers, a particular service provider to perform the requested service. Specifically, embodiments of the present invention can make a determination of which service providers will be presented to the consumer by comparing the service request data entered/uploaded by the consumer with the service provider profile data of those service providers having profile data stored in the database. Embodiments of the present invention perform such comparisons based on various types of matching criteria. For example, the matching criteria may include an address of the service provider being located within a predetermined distance from and/or located closest to the address of the consumer. In certain embodiments, the predetermined distance may be requested and/or input by the consumer. In other embodiments, the distance may be preselected via embodiments of the present invention. Furthermore, the matching criteria may include the address of the consumer being within the jurisdiction of the service provider. Furthermore still, the matching criteria may include the subject matter of the legal contract being associated with the practice area of the service provider.

Figure 5:
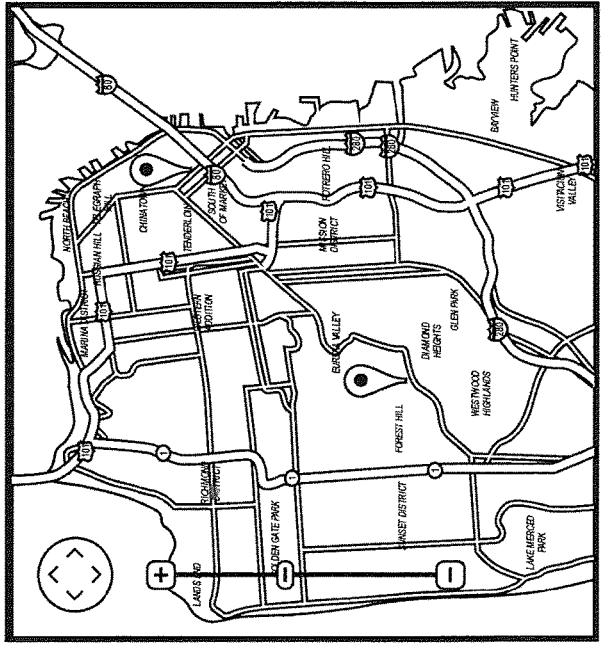
FIG. 5 is a depiction of a service provider selection screen according to embodiments of the present invention.

Once embodiments of the present invention have compared the service request data with the service provider profile data based on the matching criteria, embodiments will select a first or primary set of service providers suited for performing the service for the consumer and will present such set of service providers to the consumer. In some embodiments, such primary set of service providers will be presented to the user, such as is shown in the service provider selection screen 500 of FIG. 5. In additional embodiments, the consumer can manually change the service providers that are presented. For instance, as shown in FIG. 5, the consumer may manually change the matching criteria to obtain an alternative first set of service providers. For example, the consumer may select a particular geographical area from which the alternative set of service providers are chosen. Such a geographical area may be a state, a county, a city, a zip code, an address or the like. In further embodiments, the consumer may enter distance ranges, within which the service providers should be located. For example, the consumer may choose to obtain a set of service providers that are each located within 15, 25, 50, 100, or 200 miles from a given zip code. In other embodiments, the consumer can manually change/modify/combine the matching criteria, as needed. For example, the consumer may choose to be presented with service providers that are located within 15, 25, 50, 100, or 200 miles from a given zip code and that have experience in a particular practice area (e.g., employment law) or that have a certain number of years' experience (e.g., more than five years' experience). As such, embodiments of the present invention provide the consumer with the ability to specifically control the matching process, so as to obtain a first listing of service providers that are best suited to meet the consumer's requirements.

As shown in Illustration 5, the service providers may be presented to the consumer in graphic form, such as having their geo-location displayed on an interactive map. Alternatively, or in conjunction, embodiments may display the service providers in list form. The presented service providers may be presented in such a format that various portions of the service provider profile data are included with the presentation. For example, the service provider's name, physical address, email address, and website URL may be presented. In embodiments in which the website URL is presented, the presentation of the website URL may include a hyperlink operable to immediately direct the consumer to the service provider's website. As such, the consumer can review relevant information included on the service provider's website, such as the service provider's background, years of experience, areas of practice, or the like.

From the set of presented service providers, such as shown in FIG. 5, the consumer can select a service provider that the consumer wants to perform the service. Upon such a selection, the consumer is provided, via the consumer's computing device 104, with an indication that the service provider has been notified of the selection, and that the consumer should await a response from the service provider.

Figure 6:
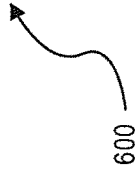
FIG. 6 is a depiction of a service request review screen according to embodiments of the present invention.

Further upon the selection of the service provider, the service provider will be provided, via the service provider's computing device 104, with an indication that it has been selected by the consumer to perform the service. At such time, portions of the service request data that was entered by the consumer will be sent to the service provider for review (See, e.g., service request review screen 600 of FIG. 6). Based on the service request data, the service provider can decide to either accept or reject to perform services for the consumer. Such a decision may be made based on various factors, such as whether the consumer and/or the adverse parties may pose a conflict of interest to the service provider, whether the subject matter of the requested service is not included within the service provider's practice area, whether the service provider does not have the time or resources to perform the additional service, or other related reasoning.

If the service provider chooses to reject to engage with the consumer, the consumer will be notified of such a rejection. Embodiments of the present invention will permit for the service provider to provide an explanation as to the reasoning for the rejection. Embodiments of the present invention may present a plurality of different predetermined explanations as to why the service provider is declining to provide the services. For instance, as shown in FIG. 7, the service provider may be presented a declination screen 700 from which the service provider may indicate that the service provider has a conflict of interest, does not have enough time to complete the service, or that the service is outside the scope of the service provider's business practice. In some instances, the service provider will be provided with a free-form type input within which the service provider can draft a unique message to explain the service provider's reasoning for declining to provide the services. Once the service provider selects a predetermined explanation or drafts its own unique explanation, such explanation is provided to the consumer to indicate that the service provider has declined to perform the services.

In such instances where the service provider declines to provide services to the consumer, the consumer may be presented with a second or secondary set of service providers from which to choose to perform the service. Embodiments of the present invention may perform a second comparison of service request data with service provider profile data (via a matching criteria) to determine the secondary set of service providers for presentation to the consumer. In other embodiments, the secondary set of service providers may simply be the primary set of service providers, excluding the service provider that declined to transact with the consumer. Regardless, one of the primary set and/or the secondary set of service providers will include at least one service provider not included in the other of the primary set or the secondary set of service providers.

Once the secondary set of service providers is determined, such a secondary set can be presented similarly to how the primary set was presented (See, e.g., FIG. 5). The consumer can once again select a service provider from the secondary set to request that the service provider perform the requested service. Once again, the selected service provider can determine whether or not to perform the services, as was previously described.

Upon a service provider agreeing to transact with the consumer, the service provider will be prompted to upload and/or enter an engagement item. The engagement item may be in the form of an agreement, letter, or contract that outlines the relationship between the service provider and the consumer (e.g., attorney-client), outlines the scope of the service, outlines the price, etc. In some embodiments, the service provider can upload the engagement item in the form of a document, such as in a .txt, .wps, .doc, .docx, .pdf, or the similar format. Other embodiments may provide free-form type input wherein the service provider can manually enter the engagement item. In still further embodiments, embodiments of the present invention may provide am engagement item in a template form, which the service provider can select to provide to the consumer. Embodiments of the present invention provide for the engagement item to be presented to the consumer for review and acceptance. In some embodiments, the service provider may also be permitted to manually set or adjust the price for performing the service and specify such price in the engagement item. Furthermore, the service provider may include any other additional information that may be pertinent. Such other information may be added in the form-free input section, thereby providing the service provider with the ability to freely include any potentially applicable information in the engagement item.

Upon receipt of the engagement item, the consumer can review the engagement item and agree to its contents via an electronic signature. Alternatively, the consumer can reject the engagement item and return to a listing of the presented set of service providers. In addition, the consumer can provide payment information by which to pre-pay for the services to be performed. The payment information can include credit/debit card information, bank ACH/routing information, PayPal information, or the like. Embodiments of the present invention include the use of other E-Commerce payment gateways (i.e., financial institutions), including PayPal, Bank of America (First Data Corp), Stripe, BrainTree and Authroize.net, such that consumers can make secure online payments directly to their selected service provider. In some embodiments, the service provider will be permitted to select which one or more types of payment gateways that are permitted to be used. Once the payment information is received from the consumer, such information is forwarded to the service provider, or the service provider's financial institution for payment processing.

Once the consumer has agreed to the terms of the engagement item (e.g., via electronic signature) and has provided payment information, the service provider will perform the required services. For example, in embodiments in which the service item is a legal contract, the service provider will download/view the legal contract, review the contract, note any issues, and raise those issues in writing for the consumer. Upon completion of performing the service, the service provider will contact the consumer directly to return the service item (including any review notes) and to perform other communications (e.g., email, telephone, etc.) as may be necessary to complete the engagement. In some embodiments, the service provider may make written notes and/or comments directly in the service item, and may then upload the commented service item to the server 102 where it can be downloaded to and/or accessed by the consumer.

During the time period in which the services are being performed, embodiments of the present invention will provide an indication to the consumer that such services are underway. Such indication may be accessible via the access of the consumer's account. Furthermore, if the consumer has uploaded a plurality of service items to be serviced, the consumer may be provided with a summary screen that lists each of the service items and summarizes the status of each service item. For example, as shown in FIG. 8, the consumer may be presented a service item summary screen 800 from which the consumer is provided with a list of service items listed by name, a status of each of the service items, and a service provider selected for performing the service for each service item (if applicable). In addition, the summary screen serves as a contract management tool and may allow the consumer to view any of the service items that have been uploaded for review.

Similar to the summary screen presented to the consumer, embodiments of the present invention provide for the service providers to be presented with one or more service provider summary screens 900, as shown in FIG. 9, which display each of the service items that have been submitted to it by consumers. With reference to FIG. 9, embodiments are configured to present, in various formats, summary screens that present the information related to consumer requests to perform service. In more detail, a summary of each of the service items that has been submitted to the service provider can be presented based on a status of the service item and/or service. For example, the submitted service items can be sorted and displayed by (1) service items that require action, (2) service items of which a consumer has selected the service provider to perform the requested service, (3) service items for which an engagement item has been sent to the consumer, (4) service items for which the consumer has agreed to the engagement item and/or made the required payment, (5) service items for which service has been completed, and (6) service items which have been rejected.

In still further embodiments of the present invention, the service providers may be presented with a payment summary screen (not shown), which details each payment that has been provided to the service provider for performing services. The payment summary screen can also illustrate whether or not the payment associated with the services was approved/processed and any related dates/times on which payments were approved/processed.

In embodiments in which the service providers is a law firm, embodiments provide for each service provider to designate each attorney included in the law firm. As such, all information related to a particular consumer, service request, service item, payment, or the like, can be managed and displayed based on each individual attorney of a given law firm.

With reference to the above-provided description, embodiments of the present invention facilitate the matching of consumers in need of services with service providers capable of rendering such services. Furthermore, embodiments of the present invention facilitate the engagement of such service providers with such consumers and also the payment for such services by the consumers.

Figure 10:
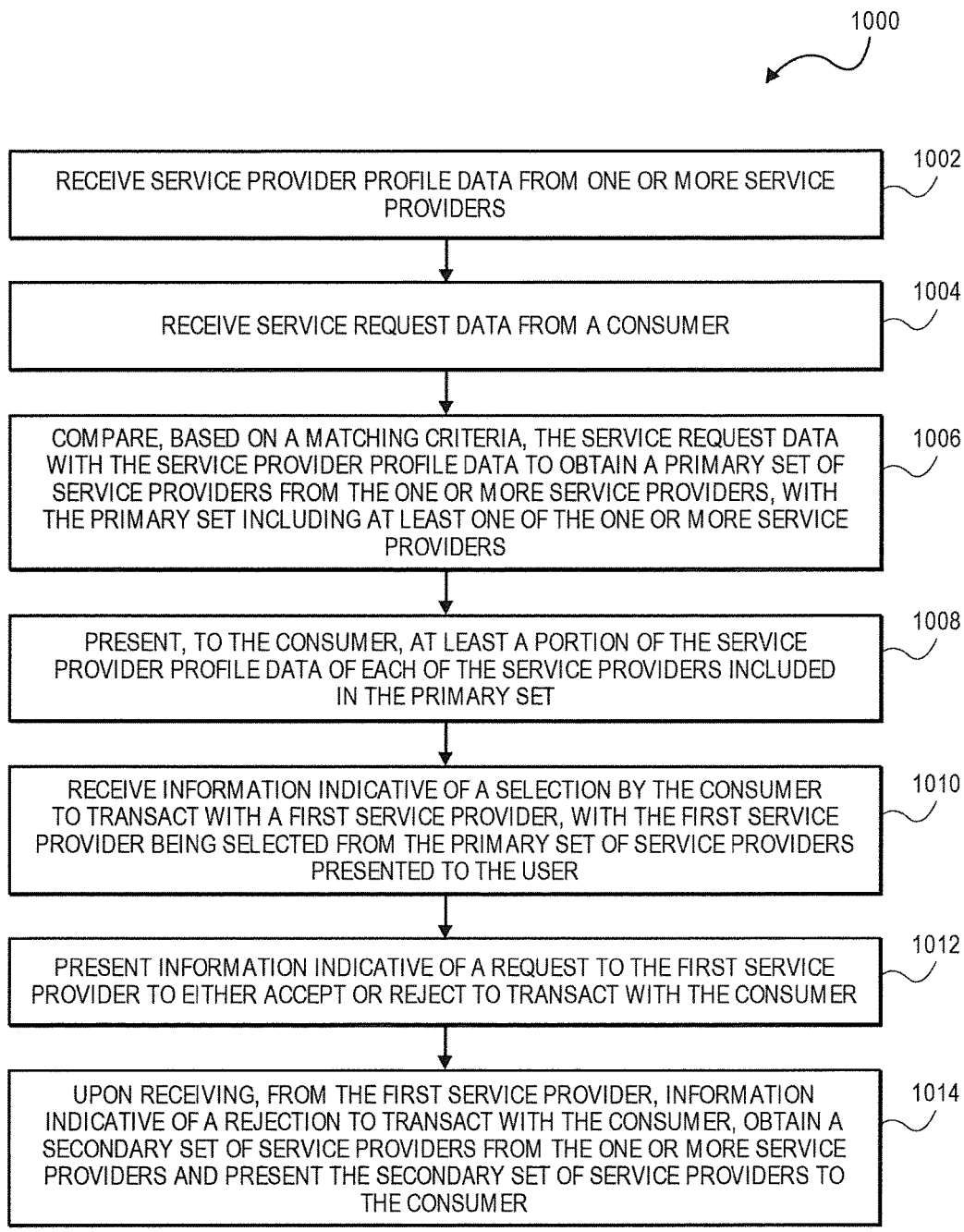
FIG. 10 is a flowchart illustrating a method for matching consumers with service providers according to embodiments of the present invention.

For instance, as illustrated by FIG. 10, embodiments of the present invention include a method 1000 for matching consumers with service providers. The method 1000 includes the initial step 1002 receiving service provider profile data from one or more service providers. An additional step 1004 includes receiving service request data from a consumer. An additional step 1006 includes comparing, based on a matching criteria, the service request data with the service provider profile data to obtain a primary set of service providers from the one or more service providers, with the primary set including at least one of the one or more service providers. An additional step 1008 includes presenting, to the consumer, at least a portion of the service provider profile data of each of the service providers included in the primary set. An additional step 1010 includes receiving information indicative of a selection by the consumer to transact with a first service provider, with the first service provider being selected from the primary set of service providers presented to the user. An additional step 1012 includes presenting information indicative of a request to the first service provider to either accept or reject to transact with the consumer. Upon receiving, from the first service provider, information indicative of a rejection to transact with the consumer, a further step 1014 includes obtaining a secondary set of service providers from the one or more service providers and present the secondary set of service providers to the consumer.

Although the invention has been described with reference to the exemplary embodiments illustrated in the attached drawings, it is noted that equivalents may be employed and substitutions made herein without departing from the scope of the invention as recited in the claims. For example, in certain embodiments, the consumer may be presented with a set of one or more service providers without first being required to upload a service item (e.g., a legal contract) and/or any other type of service request data. For example a consumer may simply access embodiments of the present invention and choose a geographic area within which to be provided a list of service providers. As previously described, the geographic area may be entered by address, zip code, city, state, or the like. The geographic area may be restricted by any particular range or distance. As such, the matching criteria of such an embodiment compares the geographic area and/or restriction entered by the user with the address/location of the service providers stored in the database. Embodiments of the present invention will, thus, present the consumer with a set of service providers located within the geographic area without being required to enter service request data, including a service item.

What is claimed:

1. At least one non-transitory computer readable storage medium with at least one executable program stored thereon for matching a consumer with one or more service providers to perform a service on behalf of the consumer, wherein the program instructs at least one processing element to perform the following steps:

generate a graphical user interface (GUI) on a graphic display of a first computing device associated with the consumer;

display a service request screen on the GUI of the consumer's first computing device, wherein the service request screen presents a request for service request data from the consumer, wherein the service request data includes a service item comprising a digitally-formatted document;

receive, over a communications network, service provider profile data from the one or more service providers;

store the service provider profile data in a database provided by a server device;

receive, over the communications network, the service request data, including the digitally-formatted document, from the consumer's first computing device, wherein the digitally-formatted document is uploaded to the first computing device upon being captured by an image-capturing device;

scan the digitally-formatted document to automatically determine a document size of the digitally-formatted document, wherein the document size is selected from: a file size, a number of pages, a number of words, and a number of characters;

generate a service price for the consumer to transact with the service providers to perform the service on behalf of the consumer, wherein the service price is generated based on the document size automatically determined from the digitally-formatted document;

compare, based on a matching criteria, the service request data with the service provider profile data to obtain a primary set of service providers from the one or more service providers, wherein the primary set includes at least one of the one or more service providers;

display to the consumer, on the GUI of the consumer's first computing device, a selection screen presenting at least a portion of the service provider profile data of each of the service providers included in the primary set, wherein the selection screen further presents a hyperlink associated with each of the service providers included in the primary set, wherein each hyperlink is configured to connect the consumer's first computing device, via the communications network, to a website associated with one of the service providers included in the primary set;

receive, via the consumer's first computing device, information indicative of a selection by the consumer to transact with a primary service provider, wherein the primary service provider is selected from the primary set of service providers displayed to the consumer;

generate a GUI on a graphic display of a second computing device associated with the primary service provider;

display, via the GUI of the primary service provider's second computing device, information indicative of a request to either accept or reject to transact with the consumer;

receive, via the primary service provider's second computing device, information indicative of a rejection by the primary service provider to transact with the consumer; and upon receiving the information indicative of the rejection by the primary service provider to transact with the consumer, obtain a secondary set of service providers from the one or more service providers and display to the consumer, on the GUI of the consumer's first computing device, service provider profile data of the service providers included in the secondary set of service providers.

2. The at least one non-transitory computer readable storage medium of claim 1, wherein the at least one program instructs the at least one processing element to perform the following additional step prior to or simultaneously with the step of displaying information indicative of a request to the first service provider:

provide at least a portion of the service request data to the first service provider.

3. The at least one non-transitory computer readable storage medium of claim 1, wherein the primary service provider is not included in the secondary set of service providers.

4. The at least one non-transitory computer readable storage medium of claim 1, wherein the service provider profile data includes one or more of the following for each service provider: a name of the service provider, an address of the service provider, a number of years of experience of the service provider, a jurisdiction of licensure of the service provider, and a practice area of the service provider.

5. The at least one non-transitory computer readable storage medium of claim 4, wherein the service request data includes one or more of the following for the consumer: a name of the consumer, an address of the consumer, and a subject matter description of the service item.

6. The at least one non-transitory computer readable storage medium of claim 5, wherein the matching criteria comprises the address of the service provider being within a particular distance from the address of the consumer.

7. The at least one non-transitory computer readable storage medium of claim 5, wherein the matching criteria includes the address of the consumer being within the jurisdiction of the service provider.

8. The at least one non-transitory computer readable storage medium of claim 5, wherein the matching criteria includes the subject matter description of the service item corresponding with the practice area of the service provider.

9. The at least one non-transitory computer readable storage medium of claim 5, wherein the service item is a contract.

10. The at least one non-transitory computer readable storage medium of claim 9, wherein the service request data further includes at least one or more of the following: a subject matter of the contract, a monetary value associated with the contract, and adverse party information for an adverse party to the contract.

11. The at least one non-transitory computer readable storage medium of claim 10, wherein the adverse party information includes a name or address of the adverse party.

12. A system for matching a consumer with one or more service providers to perform a service on behalf of the consumer, said system comprising:
  a server device comprising a processing element and one or more memory elements, wherein the memory elements of said server device provide a database for said system;
  a first computing device, wherein said first computing device is associated with the consumer and comprises one or more processors and a graphic display;
  an image-capturing device associated with said first computing device and configured to capture digital images;
  a second computing device, wherein said second computing device is associated with a primary service provider from the one or more service providers, wherein said second computing device comprises one or more processors and a graphic display; and
  a communications network configured to communicatively connect said first computing device, said second computing device, and/or said server device,
  wherein said system is configured to perform the following steps:
    generate a graphical user interface (GUI) on the graphic display of the first computing device associated with the consumer,
    display a service request screen on the GUI of the consumer's first computing device, wherein the service request screen presents a request for service request data from the consumer, wherein the service request data includes a service item comprising a digitally-formatted document,
    receive, over the communications network, service provider profile data from the one or more service providers,
    store the service provider profile data in the database provided by the server device,
    receive, over the communications network, the service request data, including the digitally-formatted document, from the consumer's first computing device, wherein the digitally-formatted document is uploaded to the first computing device upon being captured by the image-capturing device,
    scan the digitally-formatted document to automatically determine a document size of the digitally-formatted document, wherein the document size is selected from: a file size, a number of pages, a number of words, and a number of characters,
    generate a service price for the consumer to transact with the service providers to perform the service on behalf of the consumer, wherein the service price is generated based on the document size automatically determined from the digitally-formatted document,
    compare, based on a matching criteria, the service request data with the service provider profile data to obtain a primary set of service providers from the one or more service providers, wherein the primary set includes at least one of the one or more service providers,
    display to the consumer, on the GUI of the consumer's first computing device, a selection screen presenting at least a portion of the service provider profile data of each of the service providers included in the primary set, wherein the selection screen further presents a hyperlink associated with each of the service providers included in the primary set, wherein each hyperlink is configured to connect the consumer's first computing device, via the communications network, to a website associated with one of the service providers included in the primary set,
    receive, via the consumer's first computing device, information indicative of a selection by the consumer to transact with the primary service provider, wherein the primary service provider is selected from the primary set of service providers displayed to the consumer,
    generate a GUI on the graphic display of the second computing device associated with the primary service provider,
    display, via the GUI of the primary service provider's second computing device, information indicative of a request to either accept or reject to transact with the consumer,
    receive, via the primary service provider's second computing device, information indicative of a rejection by the primary service provider to transact with the consumer, and
    upon receiving the information indicative of the rejection by the primary service provider to transact with the consumer, obtain a secondary set of service providers from the one or more service providers and display to the consumer, on the GUI of the consumer's first computing device, service provider profile data of the service providers included in the secondary set of service providers.

13. A computer-implemented method for matching a consumer with one or more service providers to perform a service on behalf of the consumer, wherein the computer-implemented method includes the following steps:
  generating a graphical user interface (GUI) on a graphic display of a first computing device associated with the consumer;
  displaying a service request screen on the GUI of the consumer's first computing device, wherein the service request screen presents a request for service request data from the consumer, wherein the service request data includes a service item comprising a digitally-formatted document;
  receiving, over a communications network, service provider profile data from the one or more service providers;
  storing the service provider profile data in a database provided by a server device;
  receiving, over the communications network, the service request data, including the digitally-formatted document, from the consumer's first computing device, wherein the digitally-formatted document is uploaded to the first computing device upon being captured by an image-capturing device;
  scanning the digitally-formatted document to automatically determine a document size of the digitally-formatted document, wherein the document size is selected from: a file size, a number of pages, a number of words, and a number of characters;
  generating a service price for the consumer to transact with the service providers to perform the service on behalf of the consumer, wherein the service price is generated based on the document size automatically determined from the digitally-formatted document;
  comparing, based on a matching criteria, the service request data with the service provider profile data to obtain a primary set of service providers from the one or more service providers, wherein the primary set includes at least one of the one or more service providers;

displaying to the consumer, on the GUI of the consumer's first computing device, a selection screen presenting at least a portion of the service provider profile data of each of the service providers included in the primary set, wherein the selection screen further presents a hyperlink associated with each of the service providers included in the primary set, wherein each hyperlink is configured to connect the consumer's first computing device, via the communications network, to a website associated with one of the service providers included in the primary set;

receiving, via the consumer's first computing device, information indicative of a selection by the consumer to transact with a primary service provider, wherein the primary service provider is selected from the primary set of service providers displayed to the consumer;

generating a GUI on a graphic display of a second computing device associated with the primary service provider;

displaying, via the GUI of the primary service provider's second computing device, information indicative of a request to either accept or reject to transact with the consumer;

receiving, via the primary service provider's second computing device, information indicative of a rejection by the primary service provider to transact with the consumer; and upon receiving the information indicative of the rejection by the primary service provider to transact with the consumer, obtaining a secondary set of service providers from the one or more service providers and display to the consumer, on the GUI of the consumer's first computing device, service provider profile data of the service providers included in the secondary set of service providers.

* * * * *